Patented Feb. 23, 1932

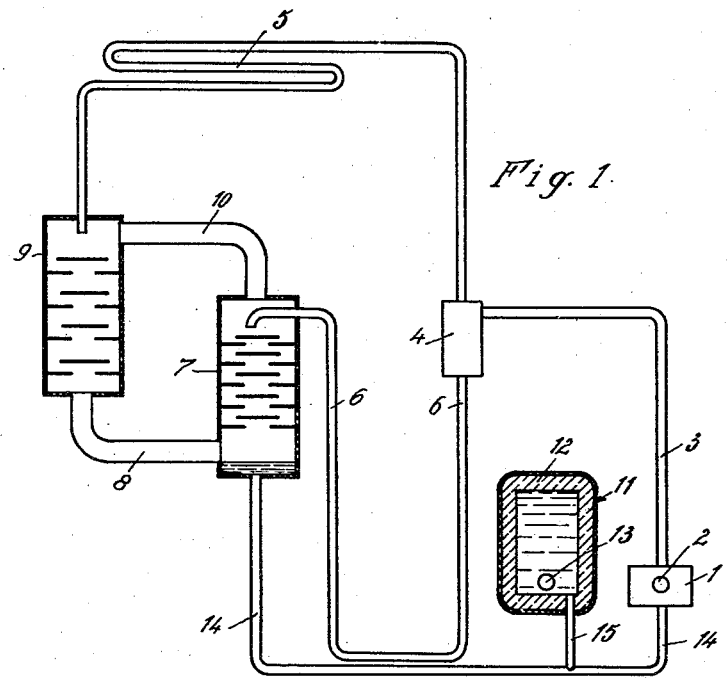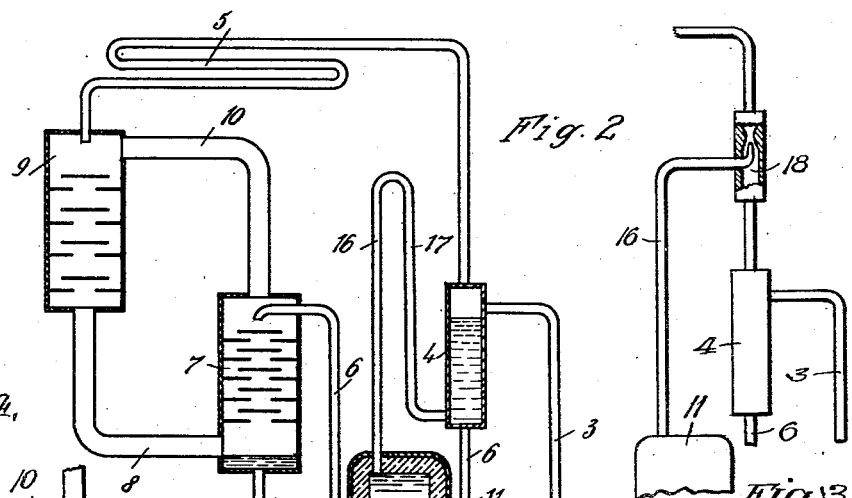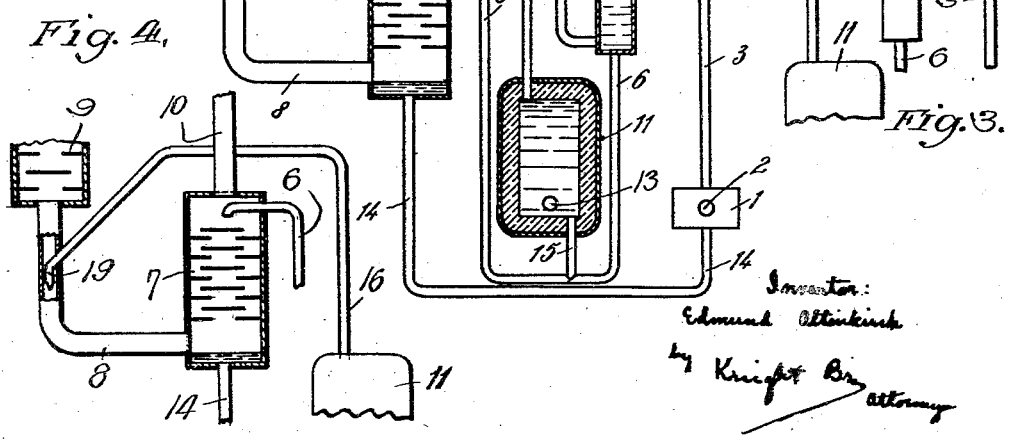

1,846,626

UNITED STATES PATENT OFFICE

EDMUND ALTENKIRCH, OF NEUENHAGEN, NEAR BERLIN, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

CONTINUOUS ABSORPTION MACHINE

Application filed October 24, 1929, Serial No. 402,026, and in Germany October 26, 1928.

My invention relates to improvements in continuous absorption machines.

In such continuous absorption machines in which the evaporation of the condensed working medium takes place in the presence of an inert or neutral gas circulating through the evaporator and the absorber, the output (for instance the amount of cold produced) depends under otherwise similar circumstances substantially on the correct quantity of the auxiliary gas circulating in the unit of time. If the circulation is too strong the output drops as it also does if the circulation is too weak. In order to be able to work at all times with a high efficiency at changing loads and under variable working conditions it is therefore desirable to be able to adapt the intensity of the gas mixture circulation to the conditions prevailing at the time.

The object of my invention is to provide an absorption machine of the type mentioned which includes a device for regulating the circulation of the gas mixture. This device according to my invention consists substantially of a container filled with absorption solution, and provided with a heater which may be controlled by any desired outside means. The device is arranged at a point of the absorption machine which is traversed by the absorption solution circulating in the absorption system in such manner that the liquid medium content of the device may be discharged into the gas mixture circulating system by heating the container, through which gaseous medium is developed from the liquid, which causes displacement of the latter and brings about the aforementioned discharge.

The connection of the container with the system is preferably made from a part of the pipe leading the strong solution from the absorber to the generator, which part is located between the generator and the heat exchanger of the absorber system.

In the drawings affixed to my specification several embodiments of my invention are illustrated by way of example. In these drawings:

Fig. 1 represents a diagrammatic illustration of my improved absorption system,

Fig. 2, a similar illustration showing a slightly modified system,

Fig. 3 represents a modified form of the arrangement shown in Fig. 2, for discharging excess vapor developed in container 11, and Fig. 4 represents another modified form for discharging excess gas from container 11 into a suitable portion of the machine.

Like parts are indicated in the figures of the drawings by like numerals of reference.

Referring to Fig. 1 of the drawings, 1 is the generator, boiler or still in which by means of an electric heating element or cartridge 2 gaseous working medium, for instance ammonia, is expelled from the strong absorption solution. The weak solution mixed with the expelled gas bubbles ascends through a riser 3 into a gas separator 4 where the ammonia separates from the liquid. While the ammonia gas flows into a condenser 5 to be condensed therein, the weak solution passes through a pipe 6 into the absorber 7 at the top. By a gas pipe 8 substantially horizontal in its lower portion the lower part of the absorber 7 communicates with the lower end of the evaporator 9 which is supplied with condensed or liquefied ammonia from the condenser 5. A second gas pipe 10 connects the upper end of evaporator 9 with the upper part of absorber 7. From the bottom of absorber 7 the strong absorption solution is discharged by a pipe 14 which forms a heat exchanger with the pipe 6 and terminates in generator 1. To the portion of the pipe 14 located between the heat exchanger and the generator is by means of a pipe 15 connected a container 11 closed gas-tight at the top and located at a level lower than the absorber. This container is enclosed by a lagging 12 and provided with a heating element 13 near the bottom, which might be operated from any suitable outside source of energy and be controlled in any desired manner.

When employing an auxiliary neutral gas which is lighter than the gaseous working medium a gas mixture circulation is set up in the direction 9, 8, 7, 10, i. e. from the lower part of the evaporator to the lower part of the absorber and from the upper part of the absorber to the upper part of the evaporator due to the particular arrangement chosen in this case and, as is well known in the art, due to the difference in the specific weights of the two gases. If the evaporator is arranged high enough in relation to the absorber, the gas mixture circulation can be adapted to the heaviest load, and with such an arrangement in case of lighter loads the circulation may be reduced to the correct value by simple throttling. This takes place in the following manner.

A part of the strong absorption solution, which returns from absorber 7 to generator 1 through pipe 14 and has been heated by the heat exchanger, normally, i. e. so long as it has not been further heated by means of the heating element 13, fills up the entire space of container 11. In absorber 7 the level of the liquid therefore remains at about the height shown in the drawings, at which an unrestricted gas mixture circulation is possible through the absorber and the evaporator. As soon as container 11 is heated by means of the heating element 13 gas ammonia is developed from the strong absorption solution, which gas accumulates in the upper part of the container and by its gas pressure displaces the liquid from container 11 into the pipes 15 and 14 and therethrough into the absorber 7. To the extent to which the liquid level rises in the absorber 7 the gas pipe 8 becomes filled with absorption solution so that the cross-section of this pipe available for the circulation of the gas mixture becomes more and more restricted. The gas mixture circulation is therefore throttled and the intensity of the evaporation and absorption process in the gas mixture circulation system is correspondingly reduced. If the capacity of container 11 is great enough it is possible by a continuous heating of its liquid content for a considerable time to fill pipe 8 with liquid to such an extent that the gas mixture circulation between the evaporator and the absorber is stopped completely. By discontinuing the heating the previous state is gradually restored through absorption of the gas in container 11 by the solution.

In this manner it is possible to regulate the intensity of the gas mixture circulation within wide limits by longer or shorter periods of heating of container 11, and thus to adapt the circulaton to the output demand on the absorption machine. Such a regulation of the gas mixture circulation is useful not only for temporarily reducing the output of the absorption machine, but it is also useful in case the gas mixture circulation is more vigorous, for instance due to an unusually small temperature difference between the absorber and the evaporator, than warranted by the output demanded of the machine. A restriction of the gas mixture circulation in such refrigerating machines thus amounts not only to a reduction of the output in cold when desired, but to an economical manner of producing it, since an excessively vigorous gas mixture circulation takes place at the cost of the output of cold.

The container 11 need not necessarily be connected to the pipe 14 which returns the strong solution from the absorber to the generator but may, as shown in Fig. 2, be connected to the line 6 through which the weak solution coming from gas seperator 4 flows into the absorber. In the apparatus illustrated in Fig. 2 container 11 is connected by a pipe 15 to that portion of the pipe 6 which is located between the gas separator and the heat exchanger, whereby the desired amount of excess liquid can be supplied from container 11 to the absorber from the top. In this case, due to the weakness of the solution in container 11, a higher temperature is necessary for heating the solution in the container to the gas expulsion point than in the system of Fig. 1. Since in such an arrangement, the solution enriched in absorber 7 is considerably diluted due to the addition of weak solution displaced from container 11, it is possible to control in this manner also the concentration of the solution flowing from the absorber into the generator 1, so that, for instance owing to the supply of weaker solution to the absorber, the absorption capacity in the latter is increased and the obtaining of lower evaporation temperatures in the evaporator is facilitated. No considerable expenditure of artificially supplied heat is, however, necessary for developing gas in container 11, since in this case the absorption solution enters container 11 in a highly heated state.

In order to force the liquid from container 11 into the higher absorber 7 it is not absolutely necessary that container 11 be closed absolutely gas-tight at the top as shown in Fig. 1. It may, as shown in Fig. 2, be in communication by a gas pipe 16 with any other part of the absorption machine at which sufficient pressure exists to permit such liquid flow to the absorber. In the system illustrated in Fig. 2, this pipe 16 opens into the gas separator 4 below the level of liquid at such a low point that the gas developed in the container enters separator 4 only when the level of the liquid in container 11 has been depressed down to the level of the heating surface of the heating element or cartridge 13. It is, however, also possible, as shown in Fig. 3 to permit any excess of gas, not required to maintain the necessary pressure in container 11, to escape from pipe 16 through a nozzle 18 into the pipe leading to condenser 5. If, as shown in the further modification Fig. 4, the gas pipe 16 terminates in a nozzle 19 located in the gas mixture circuit, the gas issuing from this nozzle may serve to maintain a vigorous circulation of the gas mixture in the absorber and evaporator at times when the difference between the specific weights of the gases alone does not suffice for this purpose, or in cases where the auxiliary gas is specifically heavier than the gaseous working medium. By correspondingly proportioning the liquid content of the absorber system the result may be attained that a moderate gas bubble development in container 11 displaces at first only a small amount of liquid from the container and merely produces a vapor jet action in the mixture circuit, but does not yet cause a reduction of the gas mixture circulation by throttling through the aforedescribed liquid displacement. This circulation is only gradually throttled when container 11 is heated more intensely or continuously for longer periods, and after thus a larger portion of the absorption solution has been displaced from the container into the absorber.

The lagging 12 prevents heat radiation and thus an excessively quick cooling of container 11.

I claim as my invention:

1. A continuous absorption machine having an absorber and an absorber system, an evaporator and a gas circulating system between the absorber and the evaporator for circulating a mixture of inert gas and gaseous operating medium between the evaporator and the absorber, in combination with a container holding a store of absorption solution and being connected with said absorber system, and means controllable at will for displacing solution from said store through said absorber into said mixture circulating system to throttle the gas mixture circulation therethrough.

2. A continuous absorption machine having an absorber and an absorber system, an evaporator and a gas circulating system between the absorber and the evaporator for circulating a mixture of inert gas and gaseous operating medium between the evaporator and the absorber, in combination with a container connected to the absorber system and being normally filled with absorption solution, and means for heating said solution to displace through the resulting gas development absorption solution from said container through the absorber into said gas circulating system to throttle the gas mixture circulation therethrough.

3. A continuous absorption machine having an absorber and an absorber system, an evaporator and a gas circulating system between the absorber and the evaporator for circulating a mixture of inert gas and gaseous operating medium between the evaporator and the absorber, in combination with a container connected to the absorber system and being normally filled with absorption solution, and means for heating said solution to displace through the resulting gas development absorption solution from said container through the absorber into said gas circulating system to throttle the gas mixture circulation therethrough, and a lagging completely surrounding said container.

4. A continuous absorption machine having an absorber and an absorber system, an evaporator and a gas circulating system between the absorber and the evaporator for circulating a mixture of inert gas and gaseous operating medium between the evaporator and the absorber, in combination with a container connected to the absorber system and being normally filled with absorption solution, and means for heating said solution to displace through the resulting gas development absorption solution from said container through the absorber into said gas circulating system to throttle the gas mixture circulation therethrough, the liquid content of said container being so proportioned relatively to the liquid content of the absorber system, that the gas mixture circulation is throttled only when a relatively large amount of solution is displaced from said container.

5. A continuous absorption machine having an absorber system including a generator, an absorber and a heat exchanger between the hot and cold portions of the solution circulating through the absorber system, an evaporator and a gas circulating system including said absorber and said evaporator for circulating a mixture of inert gas and gaseous operating medium between the evaporator and the absorber, in combination with a container connected to the absorber system at a point between said heat exchanger and said generator and being normally filled with rich absorption solution and means for heating said solution at will to displace through the resulting gas development solution from said container through said absorber into said gas mixture circulating system, to throttle the mixture circulation therethrough.

6. A continuous absorption machine having an absorber system including a generator, an absorber and a heat exchanger between the hot and cold portions of the solution circulating through the absorber system, an evaporator and a gas circulating system including said absorber and said evaporator for circulating a mixture of inert gas and gaseous operating medium between the evaporator and the absorber, in combination with a container connected to the absorber system at a portion traversed by hot, relatively poor absorption solution, and being normally filled with absorption, and means for further heating said solution at will to displace through the resulting gas development solution from said container through said absorber into said gas mixture circulating system, to throttle the mixture circulation therethrough.

7. A continuous absorption machine having an absorber and an absorber system, an evaporator and a gas circulating system between the absorber and the evaporator for circulating a mixture of inert gas and gaseous operating medium between the evaporator and the absorber, in combination with a container connected to the absorber system and being normally filled with absorption solution and means for heating said solution at will to displace through the resulting gas development absorption solution from said container through said absorber into said gas mixture circulating system, to throttle the gas mixture circulating therethrough, the container space holding the developed gas having a gas connection with other suitable gas containing portions of the machine, and means for sufficiently throttling said gas connection to maintain the desired solution displacement in said container.

8. A continuous absorption machine having an absorber system for circulating absorption solution and including a generator, a gas separator and an absorber, an evaporator and a gas circulating system including the absorber and the evaporator for circulating a mixture of inert gas and gaseous operating medium between the evaporator and the absorber, in combination with a container connected to the absorber system at a point between said gas separator and said absorber and being normally filled with absorption solution, and means for heating said solution at will to displace through the resulting gas development solution from said container through said absorber into said gas mixture circulating system to throttle the mixture circulation therethrough.

9. A continuous absorption machine having an absorber system for circulating absorption solution and including a generator, a gas separator and an absorber, an evaporator and a gas circulating system including the absorber and the evaporator for circulating a mixture of inert gas and gaseous operating medium between the evaporator and the absorber, in combination with a container connected to the absorber system at a point between said gas separator and said absorber and being normally filled with absorption solution, and means for heating said solution at will to displace through the resulting gas development solution from said container through said absorber into said gas mixture circulating system to throttle the mixture circulation therethrough, the container space holding the developed gas having an inverted U-shaped gas connection with said separator entering the latter at a point sufficiently below the level of the liquid therein to maintain the desired solution displacement in said container.

10. A continuous absorption machine having an absorber system for circulating absorption solution and including a generator, a gas separator and an absorber, an evaporator and a gas circulating system including the absorber and the evaporator for circulating a mixture of inert gas and gaseous operating medium between the evaporator and the absorber, in combination with a container connected to the absorber system and being normally filled with absorption solution, and means for heating said solution at will to displace through the resulting gas development solution from said container through said absorber into said gas mixture circulating system to throttle the mixture circulation therethrough, said gas separator having a conduit for discharging the gaseous operating medium separated from the solution, the container space holding the developed gas having a gas connection with said gas discharge conduit terminating in said conduit in a nozzle, whereby the gas discharge from the container is sufficiently throttled to maintain the desired solution displacement in said container.

In testimony whereof I affix my signature.

EDMUND ALTENKIRCH.